United States Patent [19]

Kondo et al.

[11] 4,245,867
[45] Jan. 20, 1981

[54] FLUID BRAKE PRESSURE CONTROL SYSTEM

[75] Inventors: Hiroyuki Kondo, Anjo; Hiroshi Takeshita, Chiryu, both of Japan

[73] Assignee: Aisin Seiki Kabushiki Kaisha, Kariya, Japan

[21] Appl. No.: 950,058

[22] Filed: Oct. 10, 1978

[51] Int. Cl.³ .............................................. B60T 13/06
[52] U.S. Cl. ................................. 303/6 C; 188/349; 303/24 A; 303/24 C; 303/24 F
[58] Field of Search ................. 303/24 C, 24 F, 24 A, 303/6 C, 23, 22; 188/195, 349

[56] References Cited

U.S. PATENT DOCUMENTS

| 4,125,291 | 11/1978 | Nogami | 303/24 F |
| 4,141,596 | 2/1979 | Takeshita et al. | 303/24 C |

*Primary Examiner*—Douglas C. Butler
*Attorney, Agent, or Firm*—Oblon, Fisher, Spivak, McClelland & Maier

[57] ABSTRACT

A fluid brake pressure control system having a hydraulic pressure control valve device controlling the wheel cylinder hydraulic pressure by the inertia in response to the vehicle deceleration with such device being located in a circuit between a master cylinder and wheel cylinders. The device includes a housing member provided thereon with an inlet port to be connected with the master cylinder and an outlet port to be connected with the wheel cylinders, the housing member being provided therein with a first chamber to be directly connected with the inlet port and a second chamber to be directly connected with the outlet port, an inertia member located in the second chamber, the inertia member being operable by inertia in response to vehicle deceleration, a cut off valve mechanism located in the first chamber, the cut off valve mechanism cutting off the hydraulic brake pressure by the inertia member, a piston member having a small diameter portion opposing the inertia member and a large diameter portion receiving the master cylinder brake pressure, the piston member being moveable to contact with the inertia member by the differential effective pressure between the small diameter portion and the large diameter portion so as to keep open the cut off valve mechanism when the hydraulic brake pressure from the master cylinder exceeds a predetermined value.

15 Claims, 5 Drawing Figures

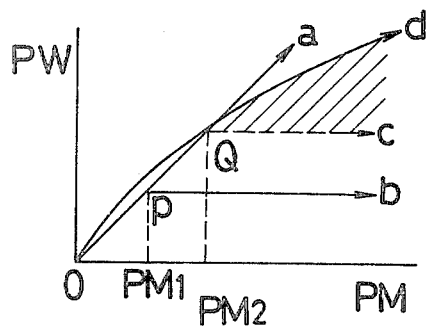
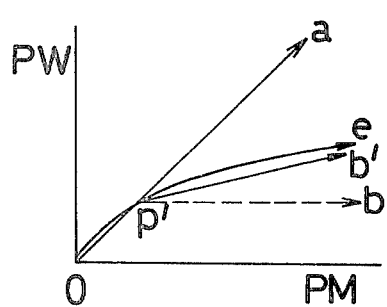
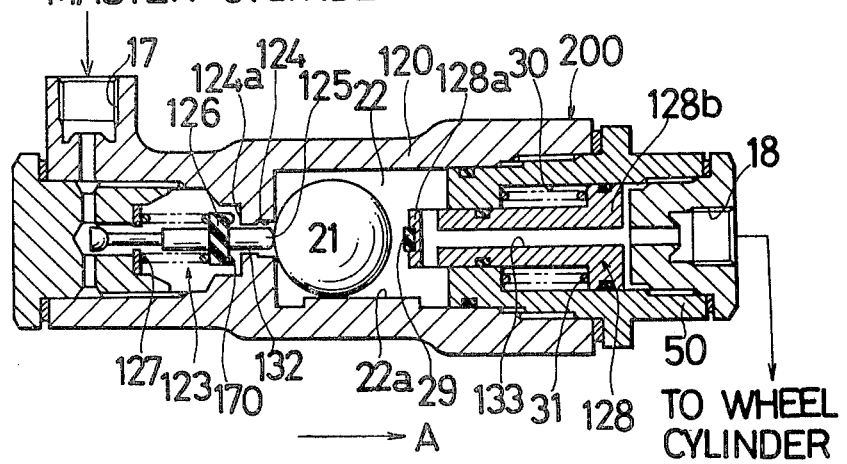

FLUID BRAKE PRESSURE CONTROL SYSTEM

BACKGROUND OF THE INVENTION

1. Field of the Invention

This invention relates to a multiple system vehicle brake and especially relates to a fluid brake pressure control system which controls a hydraulic break pressure of a rear brake system in response to a deceleration of the vehicle.

2. Description of the Prior Art

It is well-known to control a wheel brake pressure in response to deceleration of the vehicle and to prevent wheel lock by excessive brake pressure supply, especially when the vehicle load is small. However, in conventional devices designed by such technique, the supply of a hydraulic brake pressure is not enough to accomplish a sufficient braking force for wheel locking when the vehicle load is large, because the above-mentioned devices were designed only for use with empty vehicles in which wheel locking can easily be controlled.

A device which is also well-known as an advancement in order to improve the above-mentioned device comprises having two different wheel brake control pressure between an empty vehicle and a fully loaded vehicle, with the latter pressure being set up with a slightly higher value than the former pressure as shown in FIG. 2, line Q-C. However, even this improvement was not found to be sufficient for establishing the ideal braking control pressure curve as shown in FIG. 2, line d.

SUMMARY OF THE INVENTION

It is an object of this invention to provide an improved fluid pressure controlling device which suppresses the increasing hydraulic pressure of the wheel brake pressure to prevent wheel locking in an empty or loaded vehicle and release the increased pressure so as to accomplish normal braking operation in a fully loaded vehicle.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein:

FIG. 2 is a graph showing the relation between the pressure in the master cylinder and the rear wheel cylinder;

FIG. 3 is a sectional view of another embodiment of the hydraulic control valve device according to the present invention;

FIG. 5 is a graph showing the character of the hydraulic brake control device as shown in FIG. 4.

DETAILED DESCRIPTION OF THE PREFERRED EMBODIMENTS

Figure 1:
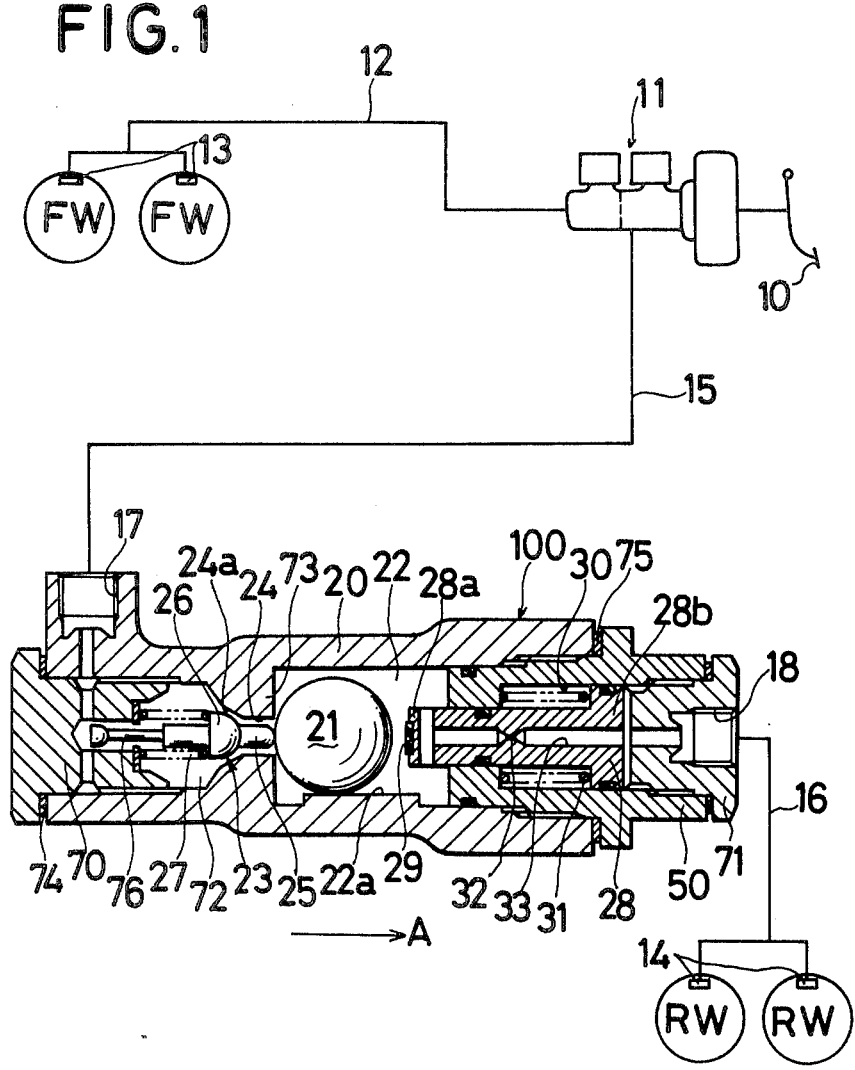
FIG. 1 is a partially sectional view of a hydraulic brake control system according to the present invention.

Referring now to FIG. 1, a fluid brake pressure control system according to the present invention is illustrated for providing a split type vehicle brake system. The brake system includes a foot pedal 10 actuating a tandem brake master cylinder 11 having two separated fluid chambers (not shown). A pair of front wheel brake cylinders 13 are connected to one of the two separated fluid chambers via a conduit 12. The front wheel brake cylinder 13 directly operates to the front wheels FW. In this case, the wheel brake pressure PW increases in proportion to the master cylinder brake pressure PM as shown in FIG. 2, line O-a and the brake operation is accomplished in response to the depression of the foot pedal 10.

The other of the two separated fluid chambers connects to a hydraulic pressure control valve device 100 via a conduit 15. The hydraulic pressure control valve device 100 further connects to a pair of rear wheel brakes 14 which operate rear wheels PW through a conduit 16. The hydraulic pressure control valve device 100 is to be aligned in the forward direction (direction of arrow A) of vehicle movement and is tilted upwardly at a predetermined angle from a horizontal plane as is well-known.

The hydraulic pressure control valve device 100 includes a housing 20, a stepped cylinder 50 and two plugs 70,71. The housing 20 is provided with an inlet port 17 which connects to the other of the two separated fluid chambers through the conduit 15. A fluid chamber 22 is defined by a partition 73 of the housing 20 and the plug 70 which is mounted in the housing 20 with a packing element 74. Another chamber 22 is defined by the partition 73 and the left end portion of the stepped cylinder 50 which is also mounted in the housing 20 with a packing element 75.

An axial bore 24 penetrates through the partition 73 so as to move a stem 25 of a cut off valve mechanism 23, freely and axially. The cut off valve mechanism 23 includes the stem 25, a spherical surface valve portion 26 and another stem 76. The cut off valve mechanism is biased in a righward direction as shown by the force of a spring 27 so as to cut off fluid connection between the chamber 72 and 22 by contact with a circular valve seat 24a.

A valve element 21, in the form of a ball which is somewhat smaller in diameter than the length of the fluid chamber 22, is positioned within the fluid chamber 22 and rests on the left end of the bottom 22a of fluid chamber 22 as shown in FIG. 1 when the vehicle is operated without braking or when the vehicle is stopping. In such case, the valve element 21 presses and moves the cut off valve mechanism 23 in a leftward direction as shown against the force of the spring 27 so as to open fluid connection between the chamber 22 and 72 which is connected to the inlet port 17.

A stepped piston 28 is located in the stepped cylinder 50 for axial movement. A small diameter portion 28a of the stepped piston 28 is exposed in the fluid chamber 22 and includes elastic member 29 which can be contacted with the ball 21 when the ball rolls up on the bottom of the fluid chamber 22. A spring 31 is positioned in peripheral chamber 30 which is formed by the stepped cylinder 50 and the stepped piston 28 and urges the stepped piston 28 in a rightward direction.

A passage 33 is drilled in the stepped piston 28 so as to connect with the chamber 22 and the rear wheel brakes 14 through an outlet port 18 which is formed in the plug 71. A large diameter portion 28b of the stepped piston 28 faces the plug 71. The passage 33 has an orifice 32 therein.

In operation of the embodiment of FIG. 1 of the present device, when the brake is applied and vehicle deceleration occurs beyond a predetermined value (for example, 0.2~0.3 G by experimental value) ball 21 rolls up on the bottom 22a of the chamber 22. The contact between the stem 25 and the ball 21 is discontinued upon the upward rolling of the ball 21 and thus, the spherical surface of the valve portion 26 contacts with the circular valve seat 24a due to the force of the spring 27.

As a result of the contact between the valve portion 26 and the valve seat 24a, hydraulic brake pressure from the master cylinder 11 to the rear wheel brake 14 is interrupted. This interrupted point is shown by point P of FIG. 2.

The hydraulic pressure PW of the rear wheel brake 14 maintains a certain value as shown in the line P-b of FIG. 2 in spite of the increase of the master cylinder hydraulic pressure, and therefore, over-braking is prevented and the wheel lock phenomenon previously described is prevented when the vehicle load is small.

In a fully or largely loaded vehicle, a larger brake force is required than the force in small load vehicle. Therefore, when the hydraulic pressure from the master cylinder 11 increases to the point Q higher than the point P on the line Q-a, vehicle deceleration moves the ball 21 away from the stem 25. But, at this point in a conventional device, the hydraulic connection between the master cylinder and the rear wheel cylinder is interrupted by cutting off the valve mechanism 23 and the rear wheel brake pressure keeps a certain value shown by line Q-c in FIG. 2. However, it is well known that the line Q-d shows the ideal brake pressure curve, and the conventional device lacks hydraulic brake pressure in the area between the line Q-d and the line Q-c. It is at this point that the present invention does not cut off the valve mechanism 23. That is, in the present invention rolling up of the ball 21 is prevented and the valve mechanism 23 is kept open so as to provide sufficient braking force when the vehicle load is large or full.

The balance formula between the forces which operates the right hand side and the left hand side of the stepped piston 28 is indicated as follows:

$$S_2 \times PM + F = S_1 \times PW \tag{1}$$

In this formula,
$S_2$ is the effective pressure receiving area of the small diameter 28a of the stepped piston 28,
$S_1$ is the effective pressure receiving area of the large diameter 28b of the stepped piston 28,
PM is the master cylinder pressure,
PW is the wheel cylinder pressure, and
F is the biasing force of the spring 31.
Accordingly, in the case of PM=PW, the formula (1) will be transformed to the following formula, $$F = (S_1 - S_2) PM \tag{2}$$

Thus, it will be understood that the master cylinder pressure PM increases in accordance with the increase of bias of the spring 31, because $(S_1-S_2)$ is a constant value.

Therefore, if the biasing force F of the spring 31 is established to resist until the master cylinder pressure increases to the point PM in FIG. 2, the leftward direction of the stepped piston 28 will be regulated as indicated by line O-P-b when the vehicle load is small. In addition, the biasing force F of the spring 31 can be established to make the piston 28 slide to the leftward direction by the difference in effective receiving area $(S_1-S_2)$ of the stepped piston 28 when the master cylinder pressure increases to the point $PM_2$.

The leftward direction movement of the stepped piston 28 prevents the ball 21 from rolling up and keeps the cut off mechanism 23 open so as to increase the hydraulic pressure of the wheel brake cylinder 14 as shown in line O-a in FIG. 2.

It is possible to prevent the ball 21 from rolling up by contacting the small diameter portion 28a of the stepped piston 28 with the ball 21 as soon as the master cylinder pressure reaches $PM_2$ after the master cylinder pressure is more than the point $PM_1$ by free establishment of the spring 31. The stepped piston 28 begins to move toward the left gradually after the master cylinder pressure reaches the point $PM_1$.

The orifice 32 restricts the flow from the chamber 22 to the rear wheel brake cylinder 14 so as to delay the increase of the hydraulic pressure of the rear wheel brake 14 and to prevent the stepped piston 28 from movement in the leftward direction until a predetermined deceleration occurs.

FIG. 3 shows a modified embodiment about the hydraulic pressure control valve device 100 of FIG. 1. Basically, the structure of a hydraulic pressure control device 200 of the modified embodiment is similar to that of hydraulic pressure control valve device 100 except the structure of cut off valve mechanism 123 and the location of orifice 132. The orifice 132 located in passage 124 such that a rod portion 125 of the cut off valve mechanism 123 can move axially therein. A valve portion 126 has an annular portion 170 which faces to valve seat 124a.

Figure 4:
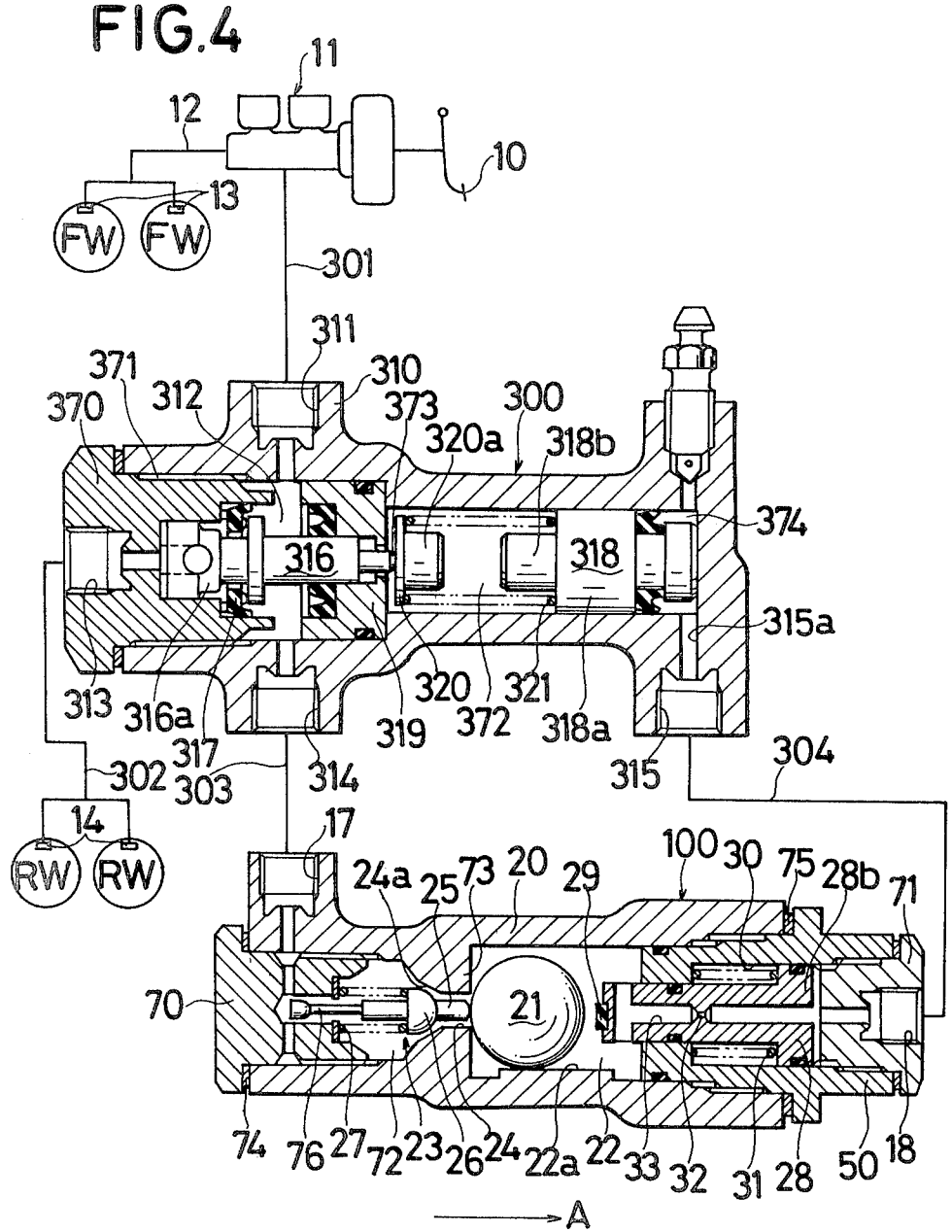
FIG. 4 is a partially sectional view of another hydraulic brake control system according to the present invention.

FIG. 4 shows another embodiment which combines the hydraulic pressure control valve device 100 shown in FIG. 1 and a second hydraulic pressure control valve device 300 in the rear brake system.

The hydraulic pressure control valve device 100 of this embodiment is the same as the hydraulic pressure control valve device 100 in FIG. 1 and has the same reference numeral designations.

The purpose of this embodiment is to increase the wheel cylinder brake pressure PW slightly, as shown in FIG. 5, line P'b', after the point P', in response to the increase of the master cylinder brake pressure PM while the rear wheel cylinder brake pressure PW keeps a certain value after the point P of FIG. 2 when the vehicle load is small.

With reference to FIG. 4, second hydraulic pressure control valve device 300 is positioned between the tandem brake master cylinder 11 and the above-mentioned hydraulic pressure control valve device 100.

The second hydraulic pressure control valve device 300 includes a housing 310 and plug member 370 which is fixed with the housing 310 by means of screw 371. The housing 310 has an inlet port 311 leading to the master cylinder 11 via a conduit 302 and a second outlet port 314 leading to an inlet port 17 of the first hydraulic pressure control valve device 100 via a conduit 303. An outlet port 18 of the first hydraulic pressure control valve device 100 connects with an inlet port 315 of the housing 310 via a conduit 304.

A retainer 319 is located in the housing 310 so as to divide housing 310 into two chambers 312, 372. The chamber 312 is defined by the plug 370 and the retainer 319. A piston valve 316 is axially movably mounted by the plug 370 at one end thereof and mounted in the retainer 319 at the other end thereof. The piston valve 316 has a valve portion 316a and a stem 373.

A retainer 320 is contacted with the stem 373 by the engagement of one end of a spring 321, and the other end of the spring 321 contacts with a control piston 318. A small diameter portion 320a of the stem 320 opposes a small diameter portion 318b of the control piston 318. A large diameter portion 318a of the control piston 318 is also provided. The valve portion 316a can contact with an elastic valve seat 317 in response to the axial movement of the piston valve 316.

When the vehicle brake is applied and the deceleration exceeds a predetermined value, the ball 21 rolls up on the bottom 22a and the cut off valve mechanism 23 cuts the hydraulic brake pressure from the master cylinder 11 to the right hand side chamber 374 in an unloaded vehicle or when the vehicle load is small. In this case, the piston valve 316 receives the rightward force of the master cylinder hydraulic pressure PM multiplied by the effective area A of the piston valve 316 and the leftward force F of the spring 321. Thus, the following formula is satisfied:

$$PM \times A = F$$

When the master cylinder hydraulic pressure PM overcomes the biasing force F of the spring 321, the valve 316a contacts with the valve seat 317 and the supply of the hydraulic brake pressure to the rear wheel cylinder is cut as shown in FIG. 5 by point P'. The force relationship is shown as follows:

$$PM(B-A) + F = PW \times B$$

In this formula,
B is the effective pressure receiving area of the valve portion 316a.

This formula can be transformed to the following formula.

$$PW = \frac{B-A}{B} PM + \frac{F}{B}$$

The wheel cylinder brake pressure PW increases as shown by line P'b' in FIG. 5. with the gradient (B−A)/B after the point P'.

As clearly described hereinabove, any desirable line will be obtained by changing the effective pressure receiving area ratio between the piston valve 316 and the valve 316a. Moreover, the point P' can be changed by changing the biasing force of the spring 321.

When the vehicle brake is applied in a fully loaded vehicle, the stepped piston 28 moves to the leftward direction against the biasing force of the spring 31 and the stepped piston 28 prevents the ball 21 from rolling up. Therefore, the cut off valve mechanism 23 keeps communication between the master cylinder hydraulic pressure and the chamber 374.

When the effective pressure receiving area of the control piston 318 is greater than the area of the piston valve 316, the control piston 318 moves in a leftward direction compressing the spring 321.

Therefore, the biasing force of the spring 321 keeps the valve 316a open from the valve seat 317 and the direct contact between the small diameter portion 320a of the retainer 320 and the small diameter portion 318b of the control piston 318 keeps the valve 316a open from the valve seat 317 represented in FIG. 5 by line O-a.

In this embodiment, the position or location of the orifice 32 is different from the first embodiment in FIG. 1. Namely, the orifice 32 in FIG. 4 is located between the master cylinder 11 and the chamber 374 of the second hydraulic pressure control valve device 300 rather than being located between the master cylinder 11 and the rear wheel cylinder 14. Accordingly, there is no harmful influence to the brake system by the orifice.

Although certain specific embodiments of the invention have been shown and described. it is obvious that many modifications thereof are possible. The invention, therefore, is not intended to be restricted to the exact showing of the drawings and description thereof, but is considered to include reasonable and obvious equivalents.

What is claimed as new and desired to be secured by Letters Patent of the United States of America is:

1. A fluid brake pressure control system for a vehicle having a hydraulic pressure control valve device controlling the hydraulic pressure of wheel cylinders of the vehicle by means of inertia in response to the vehicle deceleration, said device being located in a circuit between a master cylinder and said wheel cylinders, said device comprising:

a housing member provided thereon with an inlet port connected with said master cylinder and an outlet port connected with said wheel cylinders, said housing member being provided therein with a first chamber directly connected with said inlet port and a second chamber directly connected with said outlet port;

an inertia member located in said second chamber, said inertia member operating by inertia in response to the vehicle deceleration;

cut off valve means located in said first chamber, said cut off valve means cutting off the hydraulic brake pressure communicated between said first and said second chambers by means of said inertia member at a first predetermined value of hydraulic brake pressure from said master cylinder under a first vehicle load value; and piston means disposed in said housing including a small diameter portion opposing said inertia member, a large diameter portion receiving said master cylinder brake pressure and a passage formed therein connected with said master cylinder and said wheel cylinders, said piston means contacting said inertia member by means of differential effective pressure between said small diameter portion and said large diameter portion so as to keep open said cut off valve means when the hydraulic brake pressure from said master cylinder exceeds a second predetermined value greater than said first predetermined value under a second vehicle load value greater than said first value.

2. A fluid brake pressure control system as set forth in claim 1, wherein said inertia member comprises a ball located between said cut off valve means and said piston means.

3. A fluid brake pressure control system as set forth in claim 1, wherein said cut off valve means comprises a stem opposed to said inertia member, a valve body, and a spring positioned between said housing member and said valve body.

4. A fluid brake pressure control system as set forth in claim 3, wherein said housing member forms an orifice surrounding said stem.

5. A fluid brake pressure control system as set forth in claim 1, wherein said piston means comprises a spring positioned between said housing member and said large diameter portion and an elastic member mounted on said small diameter portion.

6. A fluid brake pressure control system as set forth in claim 1, wherein said piston means further comprises an orifice provided in said passage, and spring means for biasing said piston means away from said inertia member.

7. A fluid brake pressure control system for a vehicle having a hydraulic pressure control valve device controlling the hydraulic pressure of wheel cylinders of the vehicle by means of inertia in response to the vehicle deceleration, said device being located in a circuit between a master cylinder and said wheel cylinders, said device comprising:

a first housing member provided thereon with an inlet port connected with said master cylinder and a first outlet port connected with said wheel cylinders, a second outlet port, and a second inlet port, said first housing member being provided therein with a first chamber directly connected with said first inlet port;

valve means disposed in said first chamber of said first housing member for controlling hydraulic brake pressure from said master cylinder to said wheel cylinders;

a second housing member provided therein with an inlet port connected to said second outlet port of said first housing member and with an outlet port connected with said second inlet port of said first housing member, said second housing member being provided therein with a first chamber directly connected to said inlet port of said second housing member and a second chamber directly connected with said outlet port of said second housing member;

an inertia member located in said second chamber of said second housing member, said inertia member operating by inertia in response to the vehicle deceleration;

cut off valve means located in said first chamber of said second housing member, said cut off valve means cutting off the hydraulic pressure communicated between said first and second chambers of said second housing member by means of said inertia member; and piston means disposed in said second housing member including a small diameter portion opposing said inertia member and the large diameter portion receiving said master cylinder brake pressure, said piston means being movable to contact with said inertia member by means of differential effective pressure between said small diameter portion and said large diameter portion so as to keep open said cut off valve means when the hydraulic brake pressure from said master cylinder exceeds a predetermined value.

8. A fluid brake pressure control system as set forth in claim 7 wherein said first housing member further comprises a second chamber and wherein retainer means are disposed within said first housing member between said first and second chamber of said second housing member.

9. A fluid brake pressure control system as set forth in claim 8 which further comprises means
mounted in said second chamber of said first housing member for retaining said cut off valve means in an open position.

10. A fluid brake pressure control system as set forth in claim 9, wherein said means for retaining said cut off valve means in an open position comprises a control piston, second retainer means, and biasing means interconnecting said control piston and said second retainer means.

11. A fluid brake pressure control system as set forth in claim 7, wherein said inertia member comprises a ball located between said cut off valve and said piston means.

12. A fluid brake pressure control system as set forth in claim 7, wherein said cut off valve means comprises a stem opposed to said inertia member, a valve body, and a spring position between said second housing member and said body.

13. A fluid brake pressure control system as set forth in claim 12, wherein said second housing member forms an orifice surrounding said stem.

14. A fluid brake pressure control system as set forth in claim 7, wherein said piston means comprises a spring position between said second housing member and said large diameter portion, a passage connected with said master cylinder and said wheel cylinders, and an elastic member mounted on said small diameter portion.

15. A fluid brake pressure control system as set forth in claim 7, wherein said piston means further comprises an orifice provided in said passage, said spring means for biasing said piston means away from said inertia member.

* * * * *